United States Patent
Funnekotter et al.

(10) Patent No.: US 7,925,971 B2
(45) Date of Patent: Apr. 12, 2011

(54) TRANSFORMATION MODULE FOR TRANSFORMING DOCUMENTS FROM ONE FORMAT TO OTHER FORMATS WITH PIPELINED PROCESSOR HAVING DEDICATED HARDWARE RESOURCES

(75) Inventors: Edward D. Funnekotter, Ottawa (CA); Jason Whelan, Ottawa (CA); Jonathan Bosloy, Kanata (CA); Patrick Brodeur, Gatineau (CA); Stephen Cadieux, Kanata (CA); Philippe-Andre Babkine, Ottawa (CA); David W. Horton, Ottawa (CA); Paul Kondrat, Ottawa (CA)

(73) Assignee: Solace Systems, Inc., Ottawa, Ontario (CA)

( * ) Notice: Subject to any disclaimer, the term of this patent is extended or adjusted under 35 U.S.C. 154(b) by 876 days.

(21) Appl. No.: 11/552,849

(22) Filed: Oct. 25, 2006

(65) Prior Publication Data

US 2007/0100920 A1    May 3, 2007

Related U.S. Application Data

(60) Provisional application No. 60/731,477, filed on Oct. 31, 2005.

(51) Int. Cl.
*G06F 9/44* (2006.01)
(52) U.S. Cl. .......... 715/236; 715/234; 715/235; 715/239
(58) Field of Classification Search ............... 715/234, 715/235, 236, 239, 249
See application file for complete search history.

(56) References Cited

U.S. PATENT DOCUMENTS

| | | | | |
|---|---|---|---|---|
| 6,772,413 | B2 * | 8/2004 | Kuznetsov | 717/136 |
| 7,013,424 | B2 * | 3/2006 | James et al. | 715/239 |
| 7,257,816 | B2 * | 8/2007 | Kulp et al. | 718/104 |
| 7,409,400 | B2 * | 8/2008 | Ramarao | 707/101 |
| 7,454,696 | B2 * | 11/2008 | Kuznetsov et al. | 715/239 |
| 2002/0111924 | A1 * | 8/2002 | Lewis | 705/413 |
| 2003/0084108 | A1 * | 5/2003 | Syed | 709/206 |
| 2004/0003185 | A1 * | 1/2004 | Efland et al. | 711/150 |
| 2004/0006741 | A1 * | 1/2004 | Radja et al. | 715/513 |
| 2004/0205694 | A1 * | 10/2004 | James et al. | 717/104 |

(Continued)

OTHER PUBLICATIONS

Daniel Tabak, Advanced Microprocessors, 1995, McGraw-Hill, 2nd Edition, pp. 21-23, 37, 67, 81, 94-95, and 189.*

(Continued)

*Primary Examiner* — Stephen S Hong
*Assistant Examiner* — Michael Scott
(74) *Attorney, Agent, or Firm* — Mark & Clerk; Richard J. Mitchell

(57) ABSTRACT

A method and apparatus for converting documents from one format to another in a speed efficient way involves a hardware module which implements several operating pipeline stages which work in parallel. The transformations are supplied and decomposed into sequences of control units. The transformation of documents consists of applying control unit sequences to input documents. The control units are themselves executed by a set of dedicated hardware resources. Furthermore the pipeline is capable of operating on more than one document at a time. Fast document transformation is a key capability of document processing systems. The use of parallel processing techniques and hardware that implements highly specialized transformation resources make this invention particularly scalable for its use in large, high speed content networks.

11 Claims, 5 Drawing Sheets

U.S. PATENT DOCUMENTS

| | | | |
|---|---|---|---|
| 2004/0268238 A1* | 12/2004 | Liu et al. | 715/513 |
| 2005/0091251 A1* | 4/2005 | Ramarao | 707/101 |
| 2005/0091588 A1* | 4/2005 | Ramarao et al. | 715/522 |
| 2005/0137998 A1* | 6/2005 | Betts et al. | 707/1 |
| 2006/0059165 A1* | 3/2006 | Bosloy et al. | 707/10 |
| 2006/0117307 A1* | 6/2006 | Averbuch et al. | 717/143 |
| 2006/0265712 A1* | 11/2006 | Zhou et al. | 718/102 |
| 2009/0150518 A1* | 6/2009 | Lewin et al. | 709/219 |
| 2009/0182953 A1* | 7/2009 | Merkey et al. | 711/136 |

OTHER PUBLICATIONS

Mart Molle, Jayant Kadambi, Mohan Kalkunte, and Howard Frazier. Packet Bursting. http://grouperieee.org/groups/802/3/z/public/presentations/nov1996/MKpk_burst.pdf, Nov. 15, 1996, IEEE, pp. 1-28.*

Daniel Tabak, Advanced Microprocessors, 1995, McGraw-Hill, 2nd Edition, added pp. 384-385.*

\* cited by examiner

TRANSFORMATION MODULE FOR TRANSFORMING DOCUMENTS FROM ONE FORMAT TO OTHER FORMATS WITH PIPELINED PROCESSOR HAVING DEDICATED HARDWARE RESOURCES

CROSS REFERENCE TO RELATED APPLICATION

This application claims the benefit under 35 USC 119(e) of prior U.S. application No. 60/731,477 filed Oct. 31, 2005, the contents of which are herein incorporated by reference.

FIELD OF THE INVENTION

This invention relates to the field content-routed networks, and in particular to a method and apparatus for converting a document from one format to another that scales in terms of speed with the throughput of a content router or a high-throughput document processing system.

BACKGROUND OF THE INVENTION

Content-based networks are described in A. Carzaniga, M. J. Rutherford, A. L. Wolf, A routing scheme for content-based networking, Department of Computer Science, University of Colorado, June 2003.

U.S. patent application Ser. No. 11/224,045, the contents of which are herein incorporated by reference, describes a methods and apparatus for highly scalable subscription matching for a content network.

FIG. 1 illustrates an exemplary content-routed network 1. The exemplary content-routed network 1 is composed of a plurality of content-routers 2, 3, 4 and 5, a plurality of publishers 6, 7 and 13, and a plurality of subscribers 8, 9, 10, 11, 12, 14, 15 and 16.

A publisher is a computer or device that can insert content into the network. Another name commonly used in the literature is an event source or a producer. A publisher connects to a content router over a link, using a certain suite of communication protocols. For example, link 17 connects publisher 7 to content router 2. Content takes the form of a set of documents which embodies some information to be shared among participants of a content networks. A typical suite of communication protocols used by publishers to send documents is to encapsulate them within an HTTP header and send them through a TCP/IP connection to a content router, although many other protocols may be utilized.

A subscriber is a computer or device that has expressed interest in some specific content. Another name commonly used in the literature is event displayers or consumers. A subscriber connects to a content router over a link, using similar communication protocols as the publishers. For example, link 22 connects subscriber 14 to content router 4. FIG. 1 also illustrates an example of content from publisher 7 being injected into the content routed network 1. Publisher 7 sends a document 25 to content router 2. Content router 2 receives the document, and matches the contents of the document against its forwarding table. The forwarding table is comprised of a series of expressions that indicates matching conditions against the contents of received documents. For example, for documents formatted as Extensible Markup Language (XML) (refer to Extensible Markup Language (XML) 1.0 (Third Edition)", W3C Recommendation 4 Feb. 2004, W3C (World Wide Web Consortium)) a suitable subscription syntax is XML Path Language (XPath) (refer to reference "XML Path Language (XPath) Version 1.0", W3C Recommendation 16 Nov. 1999, W3C (Word Wide Web Consortium)).

In the field of content networks, XML is establishing itself as the language of choice for exchanging documents. Transferring documents in XML does not guarantee the interoperability between the participants of a content network. Sometime the network's participants do not share a common format or schema as is known in the art, for the documents they wish to exchange. It then becomes necessary to transform a document before delivering it to subscribers. A means for specifying these transformations and applying them becomes a requirement of a content network.

FIG. 1 exemplifies a content network 1 with transformation capability comprising content routers (CR) 2, 3, 4, 5, interconnected by links 18, 21, 23 and 24. In this case the network 1 provides the usual content routing function but furthermore it also provides the document transformation capability. The network contains a set of subscriptions which will result in the forwarding of document 25 to subscribers 9, 10, 12 and 14. Subscriber 9 shares the same document format as publisher 7; hence the network will deliver to it an unmodified copy 26 of document 25. Subscriber 10, connected to content router 3 by link 19, and 12 expect the content of publisher 7 to be forwarded to it but for them to make use of the document's content, they require a conversion to a different format, specified by transformation 32. Content router 3 is aware of the required transformation and applies it to the input document 27 producing documents 28 and 29, which then get sent to subscriber 10 and 12 respectively. Similarly, content router 4 is aware of transformations 33 and 34. Subscriber 14 requires two copies of document 25: one copy to be converted as per transformation 33 and another one as per transformation 34. After the transformations have been applied, documents 31 and 35 are sent to subscriber 14.

As per the previous example, a content network's functionality is extended by also providing a document transformation capability. This is done by extending the entries of the content router's forwarding table to also include a reference to one or many transformations. In the above example the forwarding entries that matched input document 27 also specified that transformation 32 should be applied before issuing the document to subscribers 10 and 12. A way of specifying transformations on XML documents is by mean of XSLT stylesheets (refer to reference "XSL Transfomations (XSLT) Version 1.0", W3C Recommendation 16 Nov. 1999, W3C (Wold Wide Wed Consortium)).

An XSLT processor is a device which takes as input XML documents and XSLT transformations and applies the said transformations to the said input documents. There are many prior art implementations of XSLT processors. Some well known ones include SAXON and Xalan, both public domain XSLT processors. Most internet web browsers also include an XSLT processor. Another prior art XSLT processor example is described in Kuznetsov (U.S. Pat. No. 6,772,413). Kuznetsov provides a method and apparatus of computing what a given transform should be based on the description of the documents' input format and output format. The transformations are computed on the fly as new input format and output format pairs are identified. The result of the computation is machine executable code targeted for a general purpose CPU, the execution of which will transform an input document in a given format to an output document in a different format.

All prior art XSLT processor examples share a common characteristic in that they do not scale very well in terms of speed. For a content router to be able to provide a document transformation capability, it needs to be able to transform document at a speed similar to its forwarding capability. For a commercially available content router like Solace Systems' VRS/32 Value-Added Services System, this would mean a transformation capacity in the order of giga bits per second. None of the prior art architectures scale to such speed and a better approach is clearly required.

SUMMARY OF THE INVENTION

The invention herein described provides a method and apparatus for transforming documents from one format to another in a speed efficient way. In one embodiment the documents are XML documents, and the transformations are supplied by means of XSLT stylesheets.

According to an aspect of the invention there is provided a transformation module for transforming documents from one format to one or more other formats according to one or many transformation functions, comprising a memory for storing a set of allowable transformations for a document, and a dedicated processor with a plurality of pipelined stages for performing a transformation on a given document, whereby the processor can operate on several transformations in parallel.

In one embodiment the invention utilizes specially designed hardware based on silicon devices such as ASICs or FPGAs. Two key characteristics of the hardware make this invention specifically speed efficient: first; the use of parallel processing in the form of multiple transformation pipeline stages and the parallel processing of multiple transformations at the same time, and second, the use of specialized dedicated hardware highly optimized for the handling of transformation operations. This is in sharp contrast to prior art such as U.S. Pat. No. 6,772,413 which generates machine code targeted for a general purpose CPU. In accordance with the invention hardware resources are provided which can directly execute atomic transformation operations. For example an atomic operation for performing template matching of XSLT stylesheets is provided. Prior art implementations need to decompose a template matching operation into many finer grain general purpose CPU machine instructions which would then be executed sequentially.

In accordance with an embodiment of the invention many parts of a document can be operated on by the different pipeline stages and a large number of documents can be operated on in parallel. This is also in contrast to prior art implementations which process documents in steps, one step at a time and one document after another.

According to another aspect of the invention there is provided a method of transforming documents from one format to one or more other formats according to one or many transformation functions, comprising storing a set of allowable transformations for a document, and performing a transformation on a given document as a plurality of pipelined stages whereby the processor can operate on several transformations in parallel.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

In an exemplary embodiment described herein, a content router routes documents formatted as Extensible Markup Language (XML) and utilizes subscriptions based on XML Path Language (XPath). The manner in which a content router forwards documents based on the content of input documents is known in the prior art as exemplified by U.S. patent application Ser. No. 11/224,045 for one example. The content router's functionality is extended to include the capability to transform documents. The transformations are written in XSL Transformations Language (XSLT). The transformations are also referred to as stylesheets in the XSLT literature.

Figure 1:
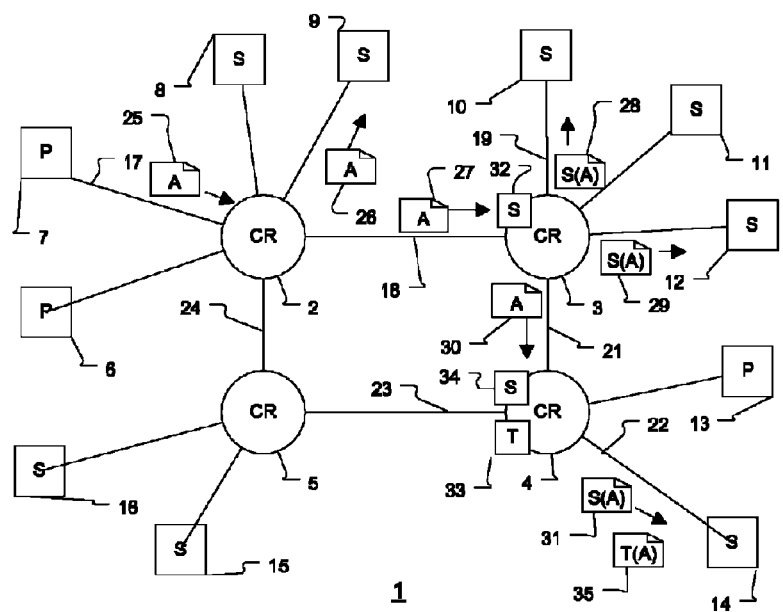
FIG. 1 shows one example of a Content-Routed Network.
Figure 2:
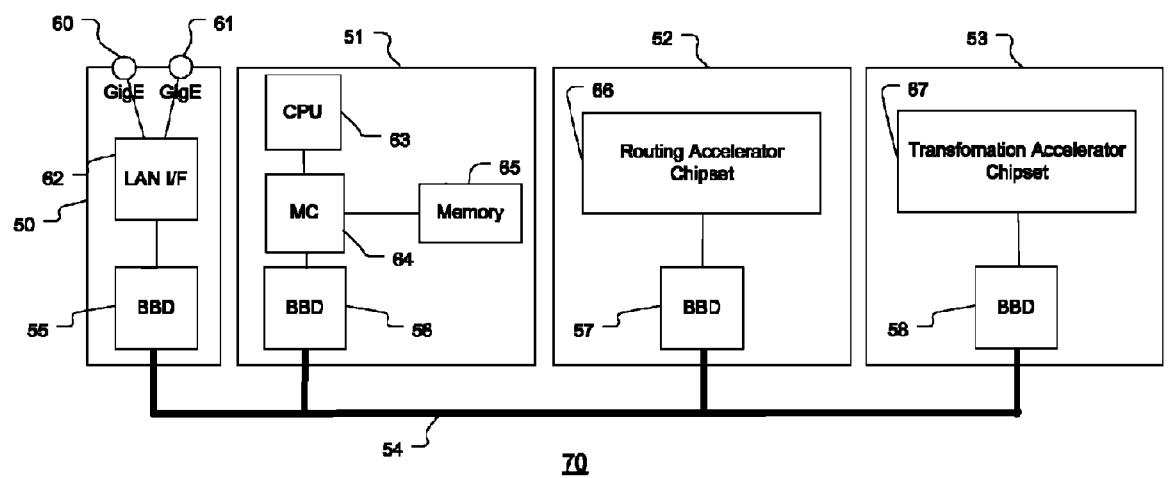
FIG. 2 shows an example content router's architecture which includes a transformation module.
Figure 7:
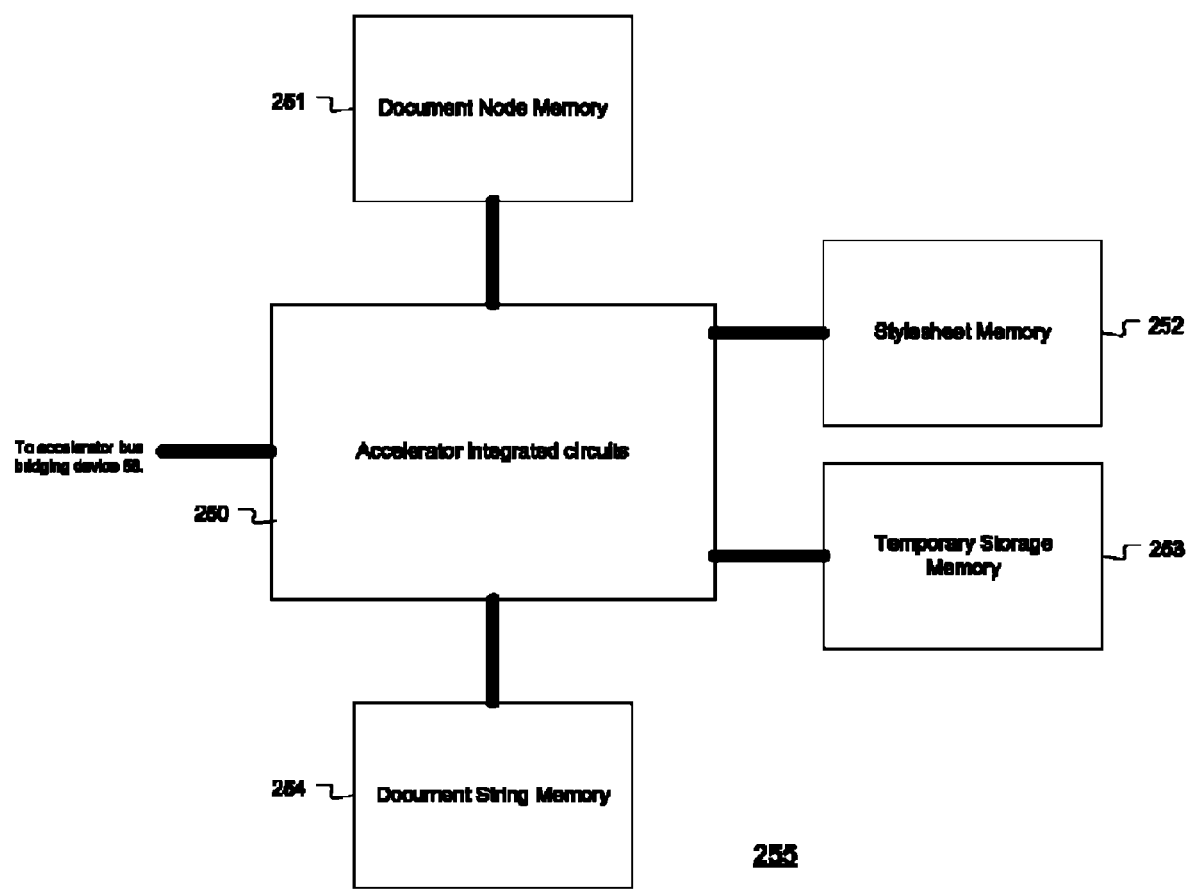
FIG. 7 shows the exemplary embodiment's transformation accelerator chipset.

An exemplary router architecture 70 is depicted in FIG. 2. Note that the invention is described in the context of a content router but another suitable host application for this invention includes, but is not limited to, web servers and document publishing or processing systems. The router consists of a set of hardware modules 50, 51, 52 and 53. Hardware modules communicate with each others via a shared high-speed communication bus 54 or a switching fabric. Examples of such buses include PCI-X, VME, PCI-E and RapidIO. Bus bridging devices 55, 56, 57 and 58 act as communication controllers between the various hardware modules. One or more Input Output modules 50 handle the physical connection of the router to other networking devices. An Input Output module typically consists of a set of Gigabit Ethernet physical interfaces 60, 61 connected to a local area network media-access device 62 which handles the termination of the module's network protocol. The routing module 51 performs the routing functions of the router. This includes, but is not limited to: maintaining statistics on port utilization, protocol termination and computing decisions, etc. The routing module consists of a general purpose CPU 63, connected to a memory controller 64 and a memory sub-system 65. A router accelerator module 52 hosts a chipset 66 used for accelerating the router's forwarding decisions. Finally, a transformation module 53 is used for performing the transformations on the documents. The transformation module consists of transformation accelerator chipset 67 which communicates with the rest of the system through a bus bridging device 58. FIG. 7 details the accelerator's chipset 255 which consists of an accelerator integrated circuit 250, a document node memory 251, a stylesheet memory 252, a temporary storage memory 253 and a document string memory 254. Suitable silicon devices for the implementation of the transformation chipset 255 include a combination of one or more of the following: FPGAs, ASICs, full custom integrated circuits 250 and memory devices 251, 252, 253 and 254. The choice of devices is a trade-off between the device's part cost and the required amount of integration possible in a given device technology.

The complete description of how the router performs the forwarding function is beyond the scope of the present invention. Discussion will be limited to a description of the interaction between the transformation module 53 and the rest of the router.

Documents can be transformed at two moments during their processing by the router. First, before a forwarding decision has been taken or secondly, after a forwarding decision has been taken on the document. In both cases, the documents reside in the routing modules' memory 65. The routing module initiates a transformation by first assigning the document to be transformed, an ingress document ID and secondly by requesting the transfer of the document to the transformation module. The later is done by copying the document from the routing module memory space to a receive buffer in the transformation accelerator, using a direct memory access (DMA), as is known in the art. The document transfer involves the routing module's bus bridging device 56 reading the document out of memory 65 by means of DMA transfers. The transformation module's bridging device 58 receives the document and writes it into the transformation receive buffer. The routing module then tells the transformation module which stylesheet to apply to the sent document by writing into command registers in the transformation's chipset. It is possible for the router to request more than one transformation on a document. The command registers' actions consist of specifying an ingress document ID and a stylesheet pointer. Also, an egress document ID is provided. The stylesheet pointer indicates the start of the data structure in the accelerator's stylesheet memory 252 that represent the stylesheet. This data structure is a sequence of control units and it will be described later. The ingress and egress document ID are used for document flow tracking purposes by the routing processor module 51. When the transformation module 53 is done applying a stylesheet to a document, it sends the transformed document back to the routing module's memory by means of DMA transfers through the accelerator's bus bridging device 58 and from the processing module's bus bridging device 56 into its memory 65. Note that due to the pipeline nature of the of the transformation module, it is not necessary to wait for the transformed documents to return from the accelerator before initiating another document transfer to it.

In the previous description, the stylesheets are pre-loaded in the transformation accelerator's stylesheet memory 252. The stylesheets describe how a given transformation is performed on documents. The mechanism by which the stylesheets are downloaded to the accelerator's control unit memory 252 is now described. The stylesheets are pre-processed by the router's routing module 51 before being loaded on the transformation module 53. The pre-processing of a stylesheet involves parsing the stylesheet, decomposing it into three static data structures. They are 1) a set of a control units, 2) a constant string table and 3) a template match information table. Controls units are atomic transformation operations that the transformation hardware can directly perform on the documents. Control units will be interpreted by various hardware resources within the transformation accelerator. The constant string table contains all the stylesheets' string constants. Finally, the template match information table is a data structure used by the template match resource 137 to compute which XSLT template to apply at a given time. The various hardware resources involved in the processing of a stylesheet will be discussed below, but first the steps required for pre-processing stylesheets will be considered.

Figure 3:
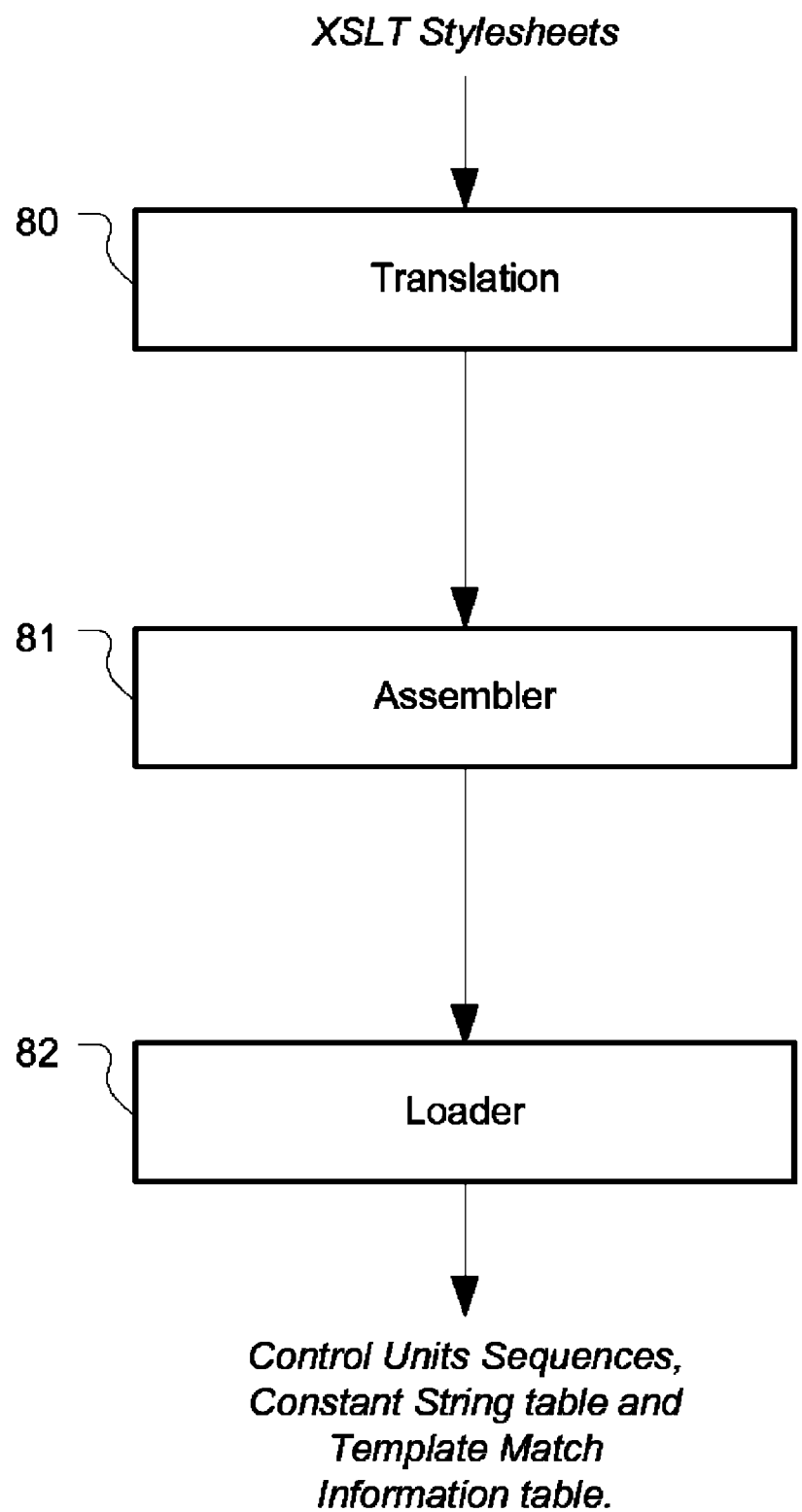
FIG. 3 shows the exemplary embodiment's stylesheets to control unit's tool chain.

The pre-processing of stylesheets into control units consists of three steps and is shown in FIG. 3. First the, stylesheets are processed by a stylesheet translation tool 80. The stylesheet translation tool 80 takes as input one XSLT stylesheet at a time (which may further include other referenced stylesheets) and generates a corresponding sequence of control units, a list of constant string table and a list of template match information table entry. The control units generated by the translation tool use symbols for the various objects that are referenced by the control units. The objects are constants, variables and control units.

The second step in the pre-processing of stylesheets is performed by the assembler tool 81. It accepts as input a transformation consisting of control unit symbols. The control units make references to constant symbols, variable symbols and other control unit reference symbols. The output of the assembler tool is again the original transformation where the symbol references for the controls units have been resolved to their machine representation. Constant symbols are also resolved into their machine representation. Finally the output of the assembler tool is fed into the last stage of the pre-processor, the loader tool 82.

The loader tool 82 manages the accelerator's stylesheet memory 252. As such it knows what segments of the stylesheet memory space 252 are available for new control units, constant string and template match info entries. The loader tools 82 resolves the symbols for constant and control unit sequences. Finally, it will load the machine representation of the stylesheets into the transformation module's stylesheet memory 252. The loader tool is also responsible for managing the de-allocation of stylesheets during the execution of the accelerator. It is possible to add and remove stylesheets from the accelerator at any given moment of its execution without impacting its operation and with minimum impact on its processing speed, provided the removed stylesheet is not in use. CPU 63 keeps track of which documents have been sent to transformation module 53 and which stylesheet(s) are in use for which document. Thus, CPU 63 can remove a stylesheet after it knows that it is not currently in use.

Now that the pre-processing of the stylesheets into control units has been described, the transformation module 53 as a whole will now described. As was previously stated, the transformation module 53 consists of a bus bridging device 58 for handling the transfer of documents back and forth between the accelerator and the routing module's memory 65. The chipset serves as a processor implementing a set of herein described digital functions and their supporting memory functions. The partitioning of the digital functions into various IC devices is known to those skilled in the art.

Figure 4:
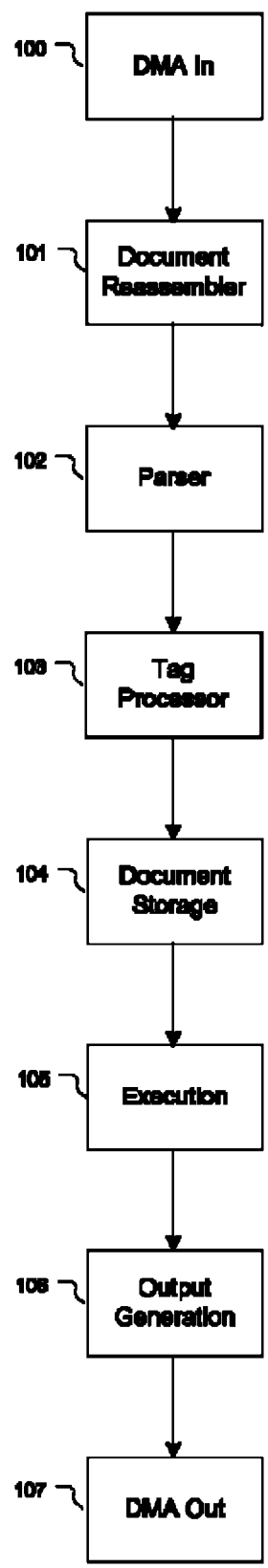
FIG. 4 shows the exemplary embodiment's hardware pipeline stages.

The transformation accelerator chipset's functions are organised as a pipeline as illustrated in FIG. 4. All stages of the pipeline execute in parallel; this means various documents or portions of a same document are being operated on in parallel by the various stages. Further more, some later stages of the pipeline are capable of operating on more than one document at the same time. The stages that operate on more than one document at a time are said to be operating on different contexts at a time. The pipeline stages are now described.

The documents to be transformed are handed off to the chipset by means of one or more DMA transfer fragments. The initiator of the DMA transfer is the DMA In stage 100 of the pipeline and the target of the DMA transfers is the routing module's memory 65. The DMA transfers occur over several bus segments. Each DMA transfer a segment of the document to be transformed, from main memory 65 into a receive buffer in the DMA In stage 100. This stage is responsible for handling the handshaking of the bus protocol between the bus bridging device 58 and the first stage of the pipeline. The bus protocol itself can be any of PCI, PCI-X, PCI-Express, Hyper Transport, other standard protocols or a proprietary one as long as the desired bus bandwidth is supported by that protocol.

The documents are read out of the DMA In stage 100, one segment at a time, and are converted into a serial byte stream by the second stage of the pipeline; the Document Reassembler stage 101. The Document Reassembler stage is also responsible for instructing the DMA in 100 stage of initiating the document DMA transfers upon reception of a document DMA request from the routing module 51. The DMA requests are issued by writing into a set of Document Reassembler 101 control registers.

The next pipeline stage is responsible for parsing the documents presented to it as a stream of bytes. The parsed documents are passed along to the next pipeline stage again as a stream of bytes. In the case where a parsing error is detected while serially parsing a document, the document's byte stream is marked with an error code which will indicate to further processing stages to in turn drop the processing of the document in question. The parsing stage 102 is said to be a non-validating XML processor which means that it does not perform any validation check like adherence to an XML schema or DTD. However, a validating parser could be used in place of the non-validating parser in parsing stage 102. The parsing stage 102 is itself divided into 7 sub-stages.

The first sub-stage of parsing detects the documents encoding and re-encodes it in Unicode. The next sub-stage processes the XML declaration if it exists. More specifically, it extracts the version, the standalone and encoding fields from the document declaration. These fields are memorized and will be used in downstream logic. The next sub-stage identifies and resolves XML characters references. (e.g. &, :). The next sub-stage performs a classification operation on the document's characters. The classification qualifies the characters into four mutually exclusive categories which are: 1) the characters that represent valid name characters; 2) the characters that represent valid name start characters; 3) characters which are not valid XML characters and finally; 4) all characters which do not fall in any of the previous categories. The next sub-stage identifies the start and end boundaries of various XML document constituent's boundaries. The identification result is passed along to the next parsing sub-stage by appending some qualifier bits to the stream of characters before handing it off to the next sub-stage. Table 1 summarizes the various XML constituent's boundaries identified by this sub-stage.

TABLE 1

Possible XML constituents

Character Attribute
Start tag boundary
Empty tag boundary
End tag boundary
Content character
Processing Instruction Name
Processing Instruction Data
Comment character
Element Name Prefix character
Default Namespace Prefix Marker
Element Name LocalPart character
Attribute Name Prefix character
Attribute Name LocalPart character
Attribute Value character
Null attribute value
Namespace declaration character
Default Namespace declaration character
Namespace delimiting character
Character with no special designation The next sub-stage performs character de-referencing and attribute normalisation. Character de-referencing and attribute normalization are common operations of any XML parser and are described in (Extensible Markup Language (XML) 1.0 (Third Edition)", W3C Recommendation 4 Feb. 2004, W3C (World Wide Web Consortium)). The last sub-stage re-encodes the document character stream into UTF-8.

The constituent's boundary information computed in the previous sub-stage is passed along to the next pipeline stage, the tag processor 103.

The Tag processor pipeline stage 103 identifies the documents' attributes and elements which are of interest and perform some well-formedness checks on the document. The interesting elements and attributes are those that are referenced by the all accelerator stylesheets' XPath expressions. For example a stylesheet may contain an XPath expressions such as "/Invoice/*[@Total>100]". This would be interpreted as a reference to any child of Invoice element where attribute Total is defined and is greater than 100. In this example, the element Invoice and the attribute Total are said to be of interest. The set of all elements and attributes of interest which are in use in the accelerator are organised in a look-up table data structure, which resides in the accelerator's element memory 254. The look-up table is maintained by the loader tool 82 as part of the stylesheet management functions. The look-up table is consulted by the Tag processor every time it encounters an element name or attribute name in a document. If the element name or attribute name is present in the look-up table then a handle to it is inserted in the document's byte stream. Note that the documents' element names are first expanded with the proper namespace if one is defined. Finally, a well-formedness check is performed by this stage which involves checking that start and end tags are properly matched.

The Document Storage stage 104 is the next step in the pipeline. At this stage, the parsed documents are stored in the accelerator's document memories 251, 254. Memory is allocated for a document when it is stored and is de-allocated when all transformations on a document have been completed. Documents are stored in two memories: a document node memory 251 (DNM) and a document string memory 254 (DSM). The document memories can contains several documents at the same time. This characteristic enables the simultaneous processing of several documents by the various pipeline and contexts of the accelerator. The DNM 251 is used to store the structure of documents and it does so by storing tree data structures, one tree per document, that represents the various nodes of XML documents. This tree structure is similar to a DOM tree as is known in the art, except that the actual string values of the documents' nodes are stored by reference. These references point to memory locations in the DSM 254, which contains the actual string value associated with the various documents' nodes. Another function of the Document Storage stage 104 is to accumulate the transformation requests from the host and issue them to the execution stage 105 once a document is waiting in the memories 251, 254. Note that the execution stage 105 operates on several documents at the same time. Each transformation request is handled by a different context. A single input document may be transformed multiple times, each of which needs its own context. While a context is executing a stylesheet on a document, it is said to be active. It is the document storage stage's responsibility to keep track of the active and non-active contexts and to dispatch the transformation requests when a context becomes non-active.

The accelerator's pipeline stages operate in parallel on many portions of the same document or many portions of different documents at the same time. The pipelining constitutes one dimension of the accelerator's parallelism. Starting at the scheduling stage another dimension of parallelism is introduced. Now, documents are being operated on by several contexts in parallel.

The portion of the hardware that executes the control units will now be described. The control units are executed in the execution stage 105 of the pipeline. The next stage of the pipeline, the output generation stage 106, receives instructions on how to assemble the transformed documents from the execution stage. In other words, the execution of the sequence of control units representing a stylesheet will result in a stream of commands to the output generation stage 106. The commands instruct the output generation stage on how to assemble together various constituents of what will ultimately become the transformed document.

Figure 6:
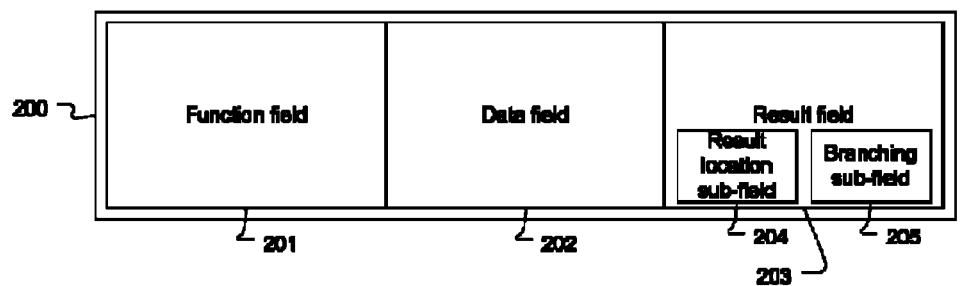
FIG. 6 details a control unit and its fields.

Control units 200 shown in FIG. 6, are made up of 3 main components: the function field 201, the data field 202 and the result field 203. The function 201 field specifies what transformation function should be executed. The data field 202 specifies the data on which the control unit should be operating on. The data field 202 references a subset of per execution context states which contain the actual data that will be used in the execution of the control unit. The execution of a control unit's function returns a result and a set of completion flags which are used to qualify the result. The function's returned value is saved in a specified context's state. The result field 203 contains a result location sub-field 204 which specifies what should be done with the result returned by the execution of the control unit's function. It also contains a branching sub-field 205 which when considered in conjunction with the set of completion flags will determine which control unit to execute next.

Control units provide the means for specifying the transformation operations for the stylesheet. The accelerator's parts that execute the operations are called resources. The input and output operations have a type, in the same sense that variables have a type in a structured programming language like C or Pascal. The hardware resources provide transformation primitives which operates on these data types. The various types supported by the accelerator are summarized in table 2.

Figure 5:
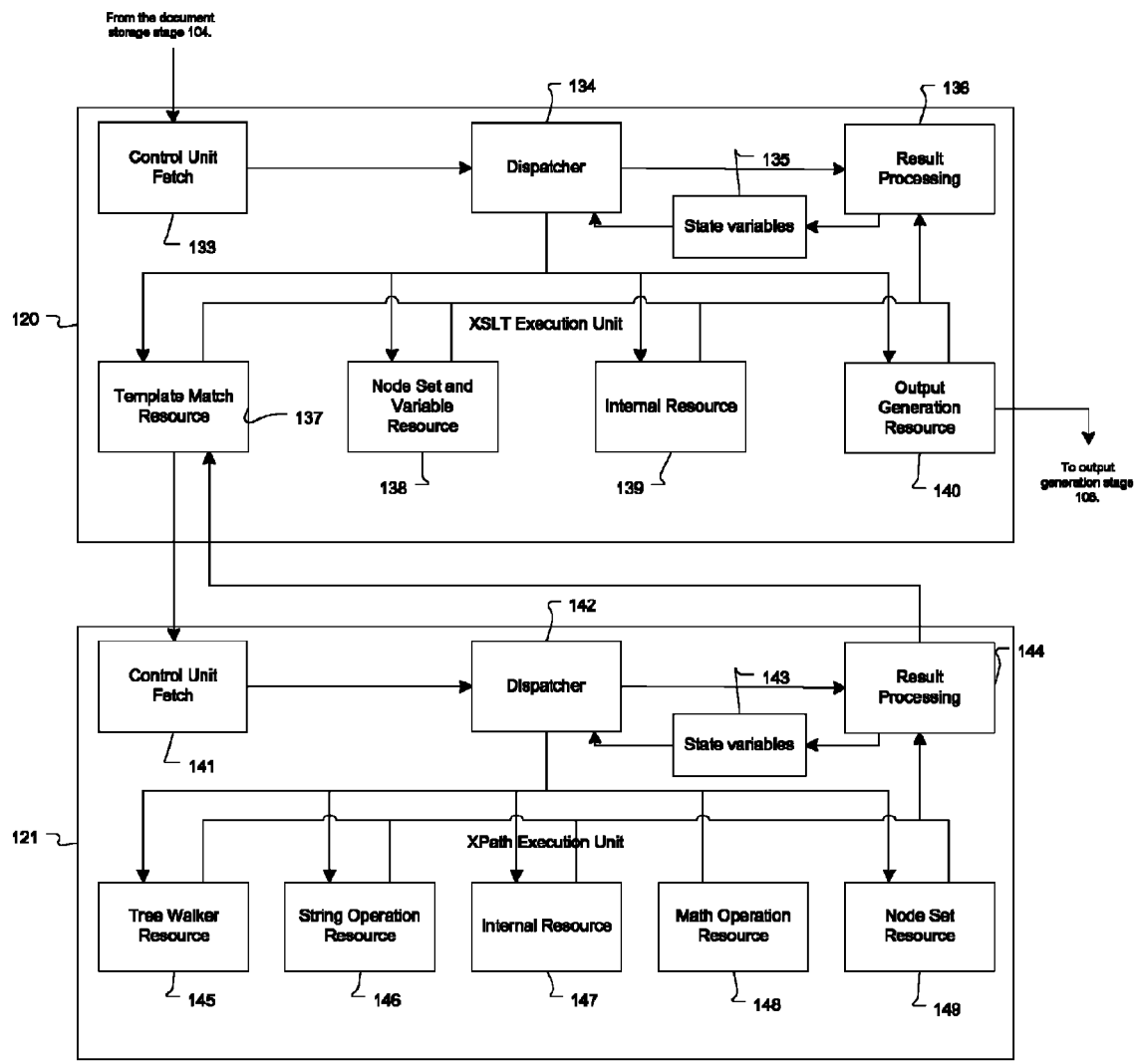
FIG. 5 shows the exemplary embodiment's execution stage.

A block diagram of the execution stage is provided in FIG. 5. The execution stage consists of two scheduling units: an XSLT scheduling unit 120 and an XPath scheduling unit 121. The execution stage is capable of processing several documents in parallel, each of which executes in a context. The XPath scheduling unit 121 operates on control units derived from the stylesheets' XPath expressions while the XSLT scheduling unit 120 operates on the control units derived from the rest of the XSLT stylesheet. Each scheduling unit is surrounded by a unique set of hardware resources 137 to 140 and 145 to 149. The resources are used to execute atomic transformation operations over the XSLT processing data types of table 2. Table 3 details the set of resources available for each scheduling units and the kind of operations handled by each of them. The operations closely map to XSLT and XPath's operations. For example the String Operation Resource 146 provides an operation CONTAIN which receives as input two STR_INFO_TYPE variables and returns a BOOL_TYPE. This resource operation maps to XPath's function contains which determine if a string is contained within another string. Certain resource operations require the use of temporary storage memory to hold the result of computations. The temporary storage memory 253 provides this facility. The temporary storage memory is itself segmented in three portions each of which is dedicated to a specific resource. The three sections and their associated resources are: 1) the variable data table which is used by the node set and variable resource, 2) the temporary string table which is used by the string operation resource and 3) the node set table which is used by the node set resource.

TABLE 2

| XSLT Data Types | |
| --- | --- |
| Data Type | Description |
| NODE_INFO_TYPE | The Node Info data type contains information that is required to access a node or perform a comparison on a node. It contains a pointer to the node allowing resources to index to it. It also contains a numerical handle of the fully qualified name and a position within the node-set if it is applicable. |
| STR_INFO_TYPE | The String Info type contains information that is used to read a string from the accelerator memory. |
| FP_NUM_TYPE | This type contains an IEEE 754 floating point number. |
| BOOL_TYPE | This type contains only a single bit that indicates a TRUE/FALSE value. |
| NODE_SEARCH_TYPE | The Node Search type is used when specifying the search criteria when performing search on documents. It is typically the data stored within control units that request a search operation. |
| INT_TYPE | This type is used for representing 32-bit integers. |
| NODE_SET_TYPE | Contains a pointer to the head of a node-set |
| NODE_CONTEXT_TYPE | Contains a pointer to a node along with its position within the node-set and the size of the node-set |
| CU_PTR_TYPE | Contains a pointer to a control unit. |
| TEMPLATE_MATCH_TYPE | This data type holds static information that is used during template matching operations. |

TABLE 3

Summary of all hardware resources and their use.

| Resource | Scheduling Unit | Description |
| --- | --- | --- |
| Template Match 137 | XSLT 120 | Performs template matching operations on documents. Also, issues XPath expression processing to the XPath execution unit 121. |
| Node Set and Variable 138 | XSLT 120 | Provides functions for accessing the elements of a node set. Also provides functions for manipulating stylesheet's variables. Stylesheet variables can be of any XSLT data type. |
| Output Generation 140 | XSLT 120 | Provides the functions required for building the constituents of the output document. |
| Tree Walker 145 | XPath 121 | Provides functions for performing searches on documents. |
| String Operation 146 | XPath 121 | Provide various string manipulation operations. |
| Math Operation 148 | XPath 121 | Provide various math operation functions. |
| Node Set 149 | XPath 121 | Node sets are lists of document's constituents. Node sets are built throughout the execution of a stylesheet. This resource provides the mechanism for manipulating node sets. |
| Internal 139 and 147 | XSLT 120 and XPath 121 | Provides a control unit branching function as well as stylesheets termination functions. Note that this resource is implemented in both the XSLT and XPath execution unit. |

The data flow inside a scheduling unit is now described. Each scheduling unit is composed of a control unit fetch block 133, 141, a dispatch block 134, 142, a result processing block 136, 144, a set of per context states 135, 143 and a set of hardware resources 137 to 140 and 145 to 149. The XSLT and XPath scheduling units 120 and 121 both share the same architecture for the control unit fetch 133, the dispatcher block 134, result processing block 136 and state variable block 135. An execution stage 120 or 121 receives control unit requests which provide a context ID and the address of a control unit. In the case of the XSLT scheduling unit the requests come from the document storage stage. The XPath scheduling unit 121 receives its requests from the template match resource 137. A scheduling unit processes the control unit requests in the following manner. The control unit fetch block 133 receives the control unit's address and context pair then reads the whole control unit from the control unit memory 252 and hands it off to the dispatch block 134. A control unit 200 is ready to be dispatched to a resource for execution when there are no outstanding resource requests in progress for that context. The dispatch unit 134 decodes which resource 137 to 140 should execute the control unit's function based on the function field 201. Also, it fetches the content of the state variable specified by the control unit data field 202 from the per context state store 135. The dispatch unit also sends the control unit's result field 203 to the result processing unit 136. Finally the dispatch unit hands off the control unit's function 201 and data 202 to the appropriate resource 137 to 140 for execution. The resource will execute the control unit's function and return the result to the result processing block. The result processing block does two things, it stores the function's results in the context state variable as specified by the return field and it computes which control unit to execute next based on the flags returned by the resource.

The output generation resource 140 is the interface to the next stage of the accelerator's pipeline: the output generation stage 106. Certain transformation's control units instruct the output generation resource to issue document generation commands. There are commands for generating all the possible XML constructs as well as commands for replicating entire portions of the original document. Since the execution stage processes multiple documents at the same time, the output generation resource interleaves the commands for the generation of several documents.

The output generation stage 106 receives the document reassembly commands which tell it how to assemble the output documents. Certain portions of the output documents are given explicitly by the execution stage, for example the name or value of elements not found in the original documents. Other portions of the output document are given by reference to the constituent of the input document stored by the document storage stage 104 in the document memory 254. Internally the documents are stored using a normalized encoding like UTF-8. It is the output generation stage's responsibility to re-encode the document in the desired output encoding. The requested encoding is specified by a transformation's control unit. The output generation stage 106 operates on as many contexts in parallel as the execution unit. This is done so as to sustain a high output document throughput.

Finally, the last stage of the accelerator pipeline is the DMA Out stage 107. This stage receives the output documents as one stream of tuples. The tuples are composed of a document character and a context ID, so it is necessary for this stage to de-interleave the documents into as many streams as there are contexts. The DMA Out stage then assembles the document streams into DMA fragments and handles the transfer of documents into fragments to the host's memory 65 through the bus bridging devices 57, 58 in a similar fashion as for the transfer of documents into the accelerator.

It will be appreciated that an exemplary embodiment of the invention has been described, and persons skilled in the art will appreciated that many variants are possible within the scope of the invention.

All references mentioned above are herein incorporated by reference.

We claim:

1. A transformation module for transforming XML documents from one format to one or more other formats according to one or many transformation functions, the transformation module comprising:
   a stylesheet translation tool for pre-processing XSLT stylesheets that describe how a given transformation is performed on a document, said stylesheet translation tool decomposing said stylesheets into an accelerator specific language consisting of static data structures comprising a set of control units that are atomic transformation operations that can be directly performed on the documents, a constant string table containing string constants for the stylesheets, and a template match information table used to compute which XSLT template to apply to a document at any a given time;
   a memory storing said XSLT stylesheets decomposed into said static data structures;
   a document node memory storing tree data structures that represent nodes of the XML documents;
   a document string memory storing string values associated with the nodes of the documents stored in the document node memory, wherein the document node memory stores references that point to memory locations in the document node memory; and
   a processor with a plurality of pipelined stages for executing the control units as atomic operations on a plurality of dedicated hardware resources, said processor being capable of executing several transformations in parallel; and
   wherein said processor comprises an XPath scheduling unit executing control units derived from Xpath expressions in said stylesheets and an XSLT scheduling unit executing control units derived from a remaining portion of said stylesheets, and said XSLT scheduling unit comprises a template matching dedicated hardware resource for performing template matching operations, a node set and variable dedicated hardware resource for accessing elements of a node set, where a node set is a list of a document's constituents, and an output generation dedicated hardware resource for building constituents of an output document, and said Xpath scheduling unit comprises a tree walker dedicated hardware resource for perforating searches on the documents, a string operation dedicated hardware resource for providing string manipulation operations, a math operation dedicated hardware resource of providing various math functions, and a node set dedicated hardware resource for building node sets.

2. A transformation module as claimed in claim 1, wherein the documents are transferred to the pipelined processor as DMA fragments.

3. A transformation module as claimed in claim 1, wherein the pipelined stages comprise in sequence:
   an interface stage for handling the physical transfer of the documents from a host;
   a reassembly stage for transforming document segments into a document stream consisting of a stream of bytes;
   a parser block for ensuring that Ore-input documents are formed according to predetermined criteria;
   a document storage block for building an internal representation of the input documents, said document storage block comprising said document node memory and said document string memory;
   an execution stage for dispatching commands obtained from the said memory storing XSLT stylesheets to said respective hardware resources of said processor;
   an output generation block for issuing output documents based on the commands received from the previous stages; and
   an output interface for transforming an interleaved stream of documents into DMA fragments for transfer to a host.

4. A transformation module as claimed in claim 3, wherein said control units are made up of three fields, namely a function field specifying what transformation function should be executed, a data field specifying the data which the control unit should operate on, and a result field that specifies what should be done with the result returned from said transformation function.

5. A transformation module as claimed in claim 4, wherein the documents are issued by the output interface in one of several encodings as specified by the set of allowable transformations.

6. A transformation module as claimed in claim 3, wherein the XPath scheduling unit is a resource of the XSLT scheduling unit and is used to schedule an XPath subset of operations of the XSLT language.

7. A transformation module as claimed in claim 1, which is configured such that stylesheets can be added and removed from memory while the processor is performing its transformation functions without interrupting the operation thereof.

8. A transformation module as claimed in claim 7, wherein the processor further comprises:
   a module for transforming the input stylesheets into a set of control unit symbols, memory location symbols, variable symbols and constant symbols;
   an assembly stage for accepting the output of a transformation tool and resolving the control unit symbols into their binary representation as understood by the XSLT and XPath scheduling units and their resources; and
   a loader stage which takes the output of the assembly stage and resolves references to symbols for the memory location, the variable symbols and constant symbols into references to absolute memory addresses.

9. A transformation module as claimed in claim 8, wherein the loader stage is configured to optimize the use of elements of one or more transformations by enabling different transformations to share common elements.

10. A content router, comprising:
    a routing module for routing incoming XML documents based on their content; and
    a transformation module for transforming the documents from one format to one or more other formats according to one or many transformation functions, said transformation module comprising:
    a stylesheet translation tool for pre-processing XSLT stylesheets that describe how a given transformation is performed on a document, said stylesheet translation tool decomposing said stylesheets into an accelerator specific language consisting of into static data structures comprising a set of control units that are atomic transformation operations that can be directly performed on the documents, a constant string table containing string constants for the stylesheets, and a template match information table used to compute which XSLT template to apply to a document at any a given time
    a memory storing said XSLT stylesheets decomposed into said static data structures; a document node memory storing tree data structures that represent nodes of the XML documents;

a document string memory storing string values associated with the nodes of the documents stored in the document node memory, wherein the document node memory stores references that point to memory locations in the document node memory;

a processor with a plurality of pipelined stages for executing the control units as atomic operations on a plurality of dedicated hardware resources said processor being capable of executing several transformations in parallel;

wherein said processor comprises an XPath scheduling unit executing control units derived from Xpath expressions in said stylesheets and an XSLT scheduling unit executing control units derived from a remaining portion of said stylesheets, and said XSLT scheduling unit comprises a template matching dedicated hardware resource for performing template matching operations, a node set and variable dedicated hardware resource for accessing elements of a node set, where a node set is a list of a document's constituents, and an output generation dedicated hardware resource for building constituents of an output document, and said Xpath scheduling unit comprises a tree walker dedicated hardware resource for perforating searches on the documents, a string operation dedicated hardware resource for providing string manipulation operations, a math operation dedicated hardware resource of providing various math functions, and a node set dedicated hardware resource for building node sets; and a bus for transferring documents from the routing module to the transformation module during processing by the router.

11. A content router as claimed in claim 10, wherein the pipelined stages comprise, in sequence:

an interface stage for handling the physical transfer of documents from a host through direct memory access;

a reassembly stage for transforming message segments into a document stream consisting of a stream of bytes;

a parser block for ensuring that the input documents are formed according to predetermined criteria;

a document storage block for building an internal representation of the input documents, said document storage block comprising said document node memory and said document string memory;

an execution stage for dispatching commands obtained from the said memory storing said XSLT stylesheets to said respective hardware resources;

an output generation block for issuing the output documents based on the commands received from the previous stages; and an output interface for transforming an interleaved stream of documents into DMA fragments for transfer to the host through the direct memory access.

* * * * *